Figure 1:
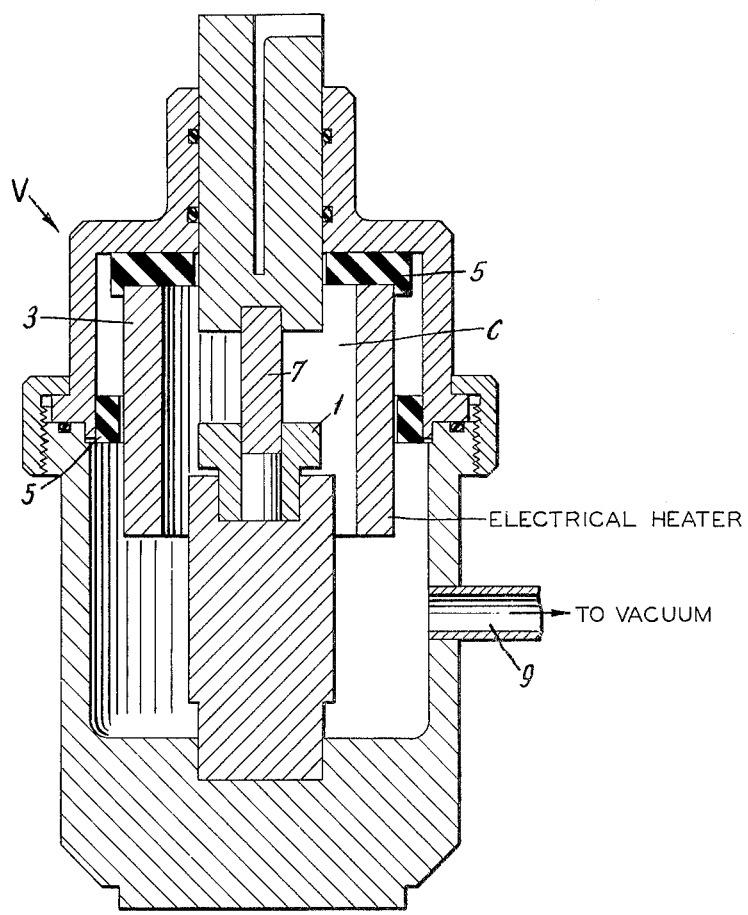

INVENTORS
DONALD C. FREEMAN, JR.
DENNIS N. STAMIRES
BY William F. Mesinger
ATTORNEY

United States Patent Office 3,213,164
Patented Oct. 19, 1965

3,213,164
PROCESS FOR COMPACTION OF ZEOLITE POWDERS
Donald C. Freeman, Jr., Tonawanda, and Dennis N. Stamires, Buffalo, N.Y., assignors to Union Carbide Corporation, a corporation of New York
Filed Dec. 28, 1960, Ser. No. 78,972
11 Claims. (Cl. 264—25)

This invention relates to a method for producing compact zeolite powders and more particularly relates to a process for making dense coherent pellets of zeolitic molecular sieve crystals for use in solid state devices such as electrolytic cells for moisture-sensing apparatus as described in our copending application Serial No. 830,349, filed July 29, 1959, this application being a continuation-in-part thereof.

A novel process has been discovered whereby crystalline zeolite powders of the molecular sieve type may be formed into a compact. One of the principal advantages of our novel process is that the compact formed thereby have very similar physical properties to the crystal zeolite. Zeolite compacts have been formed, by the process of the invention, which have a close to theoretical density, good adsorption capacity, and a high crystallinity.

The invention is predicated on the discovery that zeolite compacts having the above mentioned qualities may be formed provided that specific conditions of pressure, temperature and hydration are used.

Accordingly, it is the main object of the invention to provide a novel process for forming zeolite compacts.

Other objects are to provide a process whereby zeolite compacts are formed which physical properties are very similar to single crystal zeolite; to provide a process for making zeolite compacts for use in solid state devices such as electrolytic cells for moisture-sensing apparatus and dry cell batteries; and to provide a process for making compactions of metal loaded crystalline zeolites of the molecular sieve type for use in catalytic cracking processes.

The invention will be described in greater detail in referring to the drawings in which:

FIG. 1 illustrates one form of apparatus suitable for carrying out the process of the invention.

Figure 2:
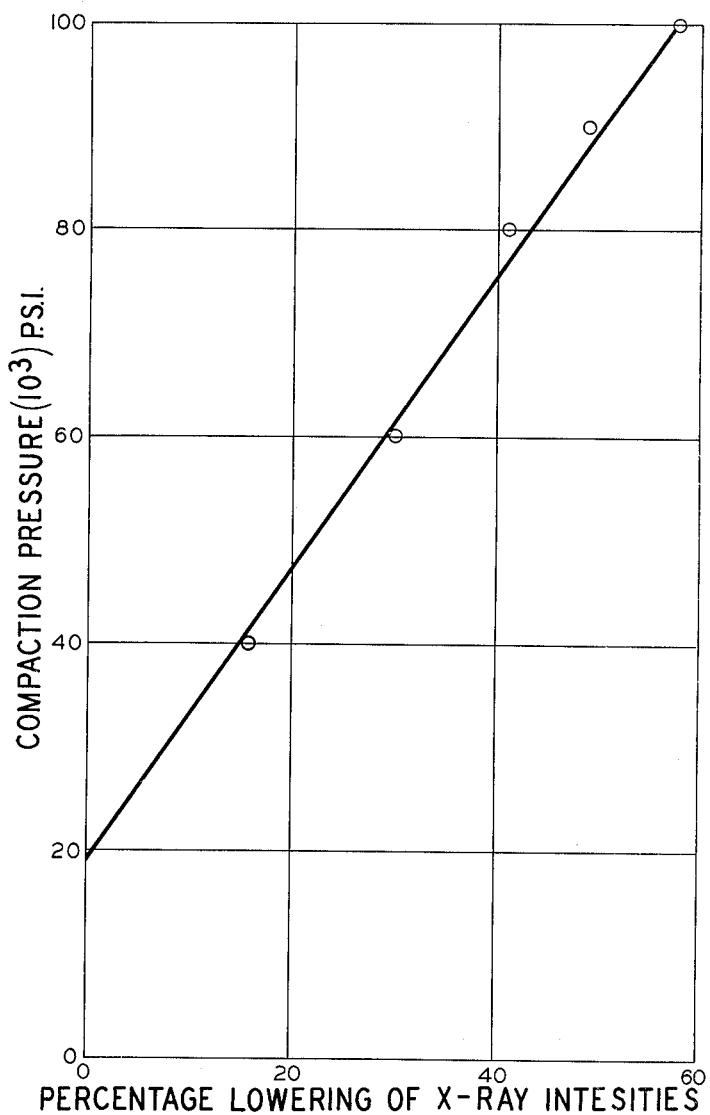
Figure 3:
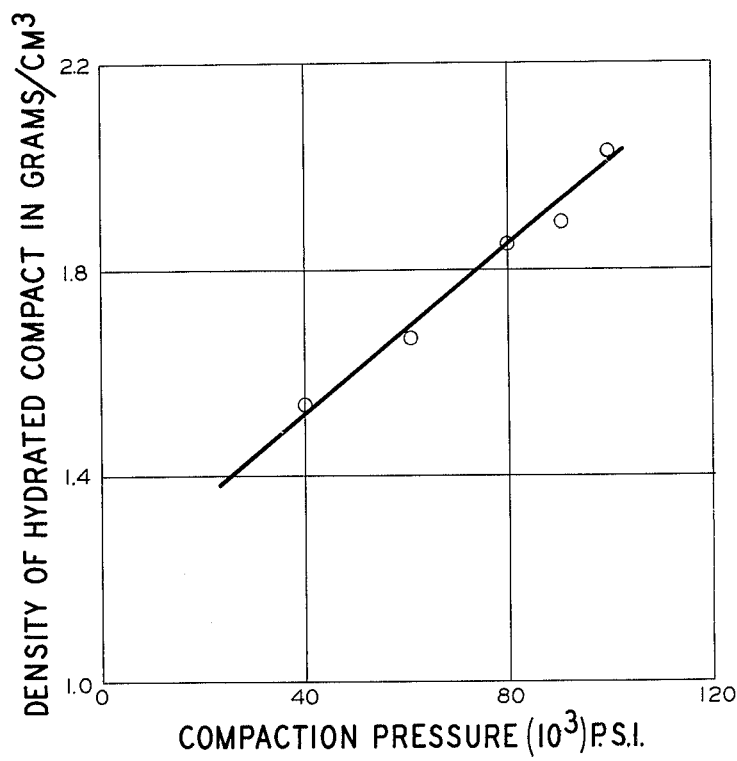
Figure 4:
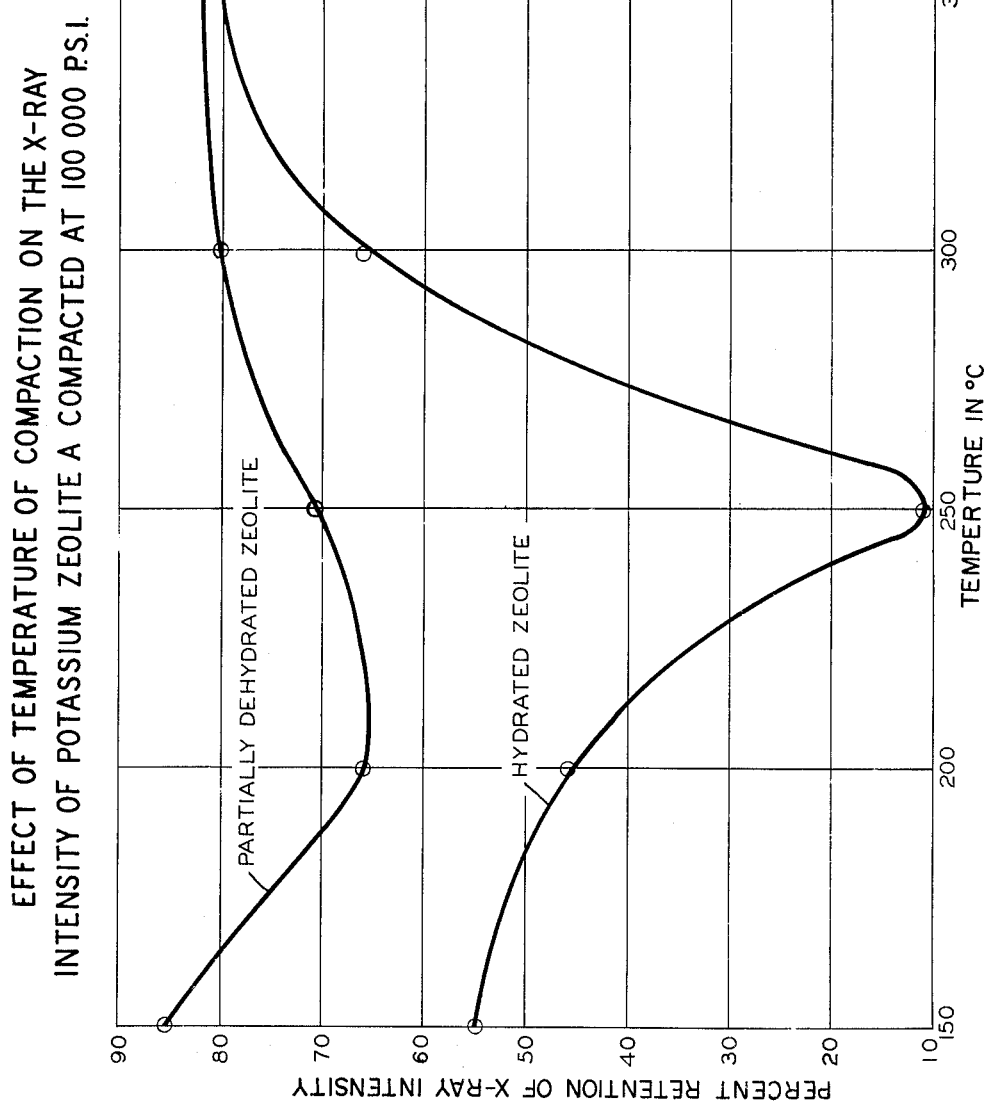

FIGS. 2, 3, and 4 are curves which illustrate respectively loss in crystallinity as a function of the compaction pressure; density increase as a function of compaction pressure; and percentage of original crystallinity remaining in a compacted zeolite as a function of the temperature at which compaction is done.

The objects of this invention are accomplished, in general, by dehydrating a crystalline zeolite power of the molecular sieve type until from about 80% up to about 95% of the moisture contained in said zeolite powder is driven off and applying at least about 10,000 p.s.i. of pressure to said partially dehydrated zeolite powder.

Any crystalline aluminosilicate zeolite whose crystal structure is not destroyed upon removal of its water of hydration may be made into dense, coherent compacts by the inventive method. Exemplary are: the naturally occurring zeolites, analcite, gmelinite, mordenite, chabazite, erionite, and faujasite and the synthetic zeolites types A, D, R, S, T, X, Y, and L. These materials are described in detail in the art and in filed applications. The compacts may be made entirely of one type or may be made of mixtures of two or more types of crystalline zeolites to obtain special effects with regard to the physical, chemical, or electrical properties of the compact.

The synthetic zeolites are preferred principally because they are freer of occluded impurities and are generally more uniform in crystal size and shape than are those obtained from mineral deposits.

The following is a list of U.S. patent applications disclosing a number of synthetic crystalline zeolites which may be used to advantage in the instant invention.

Zeolite A is described and claimed in U.S. Patent No. 2,882,243 patented April 14, 1959.
Zeolite X is described and claimed in U.S. Patent No. 2,882,244 patented April 14, 1959.
Zeolite R is described and claimed in U.S. Patent application Serial No. 680,381, filed August 26, 1957 now Patent No. 3,030,181.
Zeolite S is described and claimed in U.S. Patent application Serial No. 724,843, filed March 31, 1958 now Patent No. 3,054,657.
Zeolite T is described and claimed in U.S. Patent No. 2,950,952 patented August 30, 1960.

In practicing the preferred embodiment of the invention, see FIG. 1, hydrated crystalline zeolite powder of the molecular sieve type is placed in a die 1 positioned in a vacuum press V. The temperature in press V is raised to a temperature in the broad range of from about 100° to 400° C. but preferably in the range of from about 150° to about 200° C. by means of an electrical heater 3 surrounding the die 1. Such heater 3 is secured to the vacuum press V by means of insulated mountings 5. Simultaneously the chamber C in the vacuum press V is evacuated by evacuating means (not shown) connected to chamber C through outlet connection 9. A vacuum pressure of 100 microns is established in chamber C. When the crystalline zeolite powder is dehydrated to from about 80% up to about 95% and preferably from about 90% up to about 95% of the moisture content originally contained in such zeolite at least 10,000 p.s.i. of pressure is applied by means of plunger 7 connected to a hydraulic press means not shown in FIG. 1. The pressure is calculated in the usual fashion from the total load applied divided by the cross-section of the compact. After the zeolite powder is compressed the heat is turned off and the compact allowed to cool and the finished product is removed from the die 1. The plunger 7 and die 1 are preferably made of abrasion-resistant, non-deforming material such as tungsten carbide. Stainless steel was found to be less satisfactory, yielding many broken pellets.

It has been found that compaction of the zeolites in the hydrated state is unsatisfactory in that severe loss of zeolite crystallinity results with attendant loss of the desirable pore structure and cation dependent electrical properties. The actual way in which the water content of the zeolite effects the crystal destruction is not known but is thought to be similar to that effected by exposure of crystalline zeolites to high temperature steam made more intense by the pressure employed. FIG. 4 shows the loss of crystallinity of a hydrated zeolite as compared to a 90% dehydrated zeolite. It is shown that greater loss of crystallinity was found at about 250° C. The lesser loss shown for 300° C. and 350° C. is believed to be due to the manner in which the testing was done. In those tests, the zeolite powder was placed in the compaction device and the temperature raised before the pressure was applied. The somewhat longer time required to reach temperature and the higher temperatures effected considerable dehydration of the zeolite before compaction.

The temperature of the zeolite powder when it is compacted should be at least 100° C. and up to about 400° C. Lower temperatures yield pellets insufficiently compacted while higher temperatures engender excessive loss of crystallinity. The temperature is adjusted into this range prior to compaction and need not be changed while the pressure is on. The best compacts have been made at temperatures in the range of 150° C. to 200° C. Electron micrographs of such compacts indicate that the crystallites are reoriented so as to eliminate practically all of the intercrystalline voids. Within the broad temperature range consideration must be given to the thermal stability of the zeolite species being compacted. For example, compaction of the ammonium cation form of a zeolite should be done at a temperature not exceeding about 300° C. in order to avoid partial decomposition of the cation to yield ammonia gas.

The pressure of compaction may be in the broad range of 10,000 p.s.i. to 200,000 p.s.i. or even higher. Lower pressures yield less dense strong compacts while beyond about 200,000 p.s.i. most of the crystalline zeolites suffer increasing loss of crystallinity. Pressure in the range of 40,000 to 60,000 p.s.i. has been found very satisfactory from the standpoint of close approach to theoretical density without undue sacrifice of crystallinity.

The compacts may be made in any size and shape desired. Small disc-like tablets with flat or convex ends are easily made for use in packed bed adsorption or catalytic processes. The disc shape which may be circular or oblated is generally best since the compaction pressure is more evenly distributed throughout the compact as it is pressed. Hemispheric shape also has this advantage. More complex shapes, such as square or rectangular plate-type compacts, can be made directly or can be cut from a disc.

The best physical strength of the compacted element is obtained when the thickness of the finished compact in the direction of application of compaction pressure is not greater than the minimum dimension of the compact in a direction normal or perpendicular to that direction. While thicker elements can be made, it will sometimes be preferred to make an oversize compact and suitably cut therefrom an element having the desired dimensions.

When the compact is made under the conditions of activating temperature and pressure set forth in this specification, the density of the finished compact approaches the theoretical for the particular zeolite. For example, the theoretical density of the potassium cation form of Type A zeolite is about 2.08. Referring to FIG. 3 the density of the compact made at about 50,000 p.s.i. is about 1.6. The percentage of lowering of X-ray intensity of the compact at 50,000 p.s.i. is about 22%, see FIG. 2. The retention of crystal structure is about 80% based on the percentage lowering of X-ray intensity. Another test made to evaluate retention of crystal structure is also adsorptive capacity of water. A compact of the sodium cation form of Type X zeolite had a water loading of 32 weight percent at 25° C. and 23 mm. Hg compared with 34 weight percent at the same conditions for the uncompacted powder.

It has also been found that zeolite compacts can be used in measurements of electrical properties of zeolites such as conductivity and thermoelectric power. Some practical applications which would evolve the use of such compacts are the following:

(a) Humidity sensing element; here the resistance of the compact is used as humidity indicator, since it is very sensitive to the presence of traces of water.

(b) In preparing solid state zeolite batteries, the electrodes are attached and the compacts prepared in the same way.

(c) The resistance of the zeolite compact has been found also to vary with the dose rate of $\gamma$-irradiation reversibly. This indicates that a zeolite compact with pressed-on electrodes could be used to measure or indicate $\gamma$-irradiation.

An example of the procedure for making zeolite compacts with pressed-on electrodes is given below for illustrative purposes.

It has been found that by compressing the powder between electrodes using the same condition described above for preparing zeolite compacts, the electrodes can be securely bonded to the zeolite compact. For example, gold, aluminum, and zinc in foil or screen form have been used for electrodes. The zeolite powder is placed between a set of electrodes in the die and plunger and then after evacuation it is slowly heated to 150° C. The pressure (50,000 p.s.i.) is applied after the sample has been allowed to dehydrate at 150° C. for ½ hour. When compressed for about 15 minutes at 150° C., the heat is turned off and when it has cooled to approximately 100° C. the compact is taken out of the die.

In addition to the uses of zeolite compacts given hereinabove such compacts could be used as membranes for separating different gases. In compacts of high density, where there are essentially no intercrystalline voids available, the diffusion of gaseous molecules will take place through the zeolite pores. Thus, a molecular sieve compact could be used to separate different size molecules.

It is to be understood that the inventive concept has been described with reference to preferred embodiments. Minor modifications may be made to the apparatus or process above described without parting from the spirit and scope of the invention. For example, the zeolite powder may be dehydrated in another vessel and transferred to the compaction apparatus using known means of avoiding rehydration between steps. The steps of releasing the pressure on the compact and cooling such compact may be interchanged without departing from the inventive concept.

What is claimed is:

1. A method of forming zeolitic compacts which comprises dehydrating a crystalline zeolite of the molecular sieve type until from about 80% up to about 95% of the moisture content originally contained in said zeolite is driven off, and applying at least about 10,000 p.s.i. of pressure to said partially dehydrated zeolite thereby forming said zeolitic compact.

2. A method for forming zeolitic powder compacts which comprises placing crystalline zeolitic molecular sieve powder in a die provided in a chamber, evacuating said chamber to establish a vacuum pressure, heating said die and crystalline zeolitic molecular sieve powder until from about 80% up to about 95% of the moisture content originally contained in said zeolitic powder is driven off, applying at least 10,000 p.s.i. of pressure at a temperature in the range from about 100° to about 400° C. to said partially dehydrated zeolitic molecular sieve powder, releasing the pressure on said powder and removing the resultant compaction of zeolitic molecular sieve powder.

3. A method according to claim 2 wherein the vacuum pressure is about 100 microns of mercury.

4. A method according to claim 3 wherein the applied pressure is from 40,000 to 60,000 p.s.i.

5. A method according to claim 3 wherein the temperature at which the pressure is applied is from about 150° to 200° C.

6. A method according to claim 4 wherein the temperature at which the pressure is applied is from about 150° to 200° C.

7. A method according to claim 1 wherein the zeolite molecular sieve powder is at least one taken from the class consisting of the naturally occurring zeolites analcite, gmelinite, mordenite, chabazite, erionite, and faujasite and the synthetic zeolites A, D, R, S, T, X, Y, and L.

8. A method of forming zeolitic compacts which comprises dehydrating a metal loaded crystalline zeolite of the molecular sieve type until from about 80% up to about 95% of the moisture content originally contained in said zeolite is driven off and applying at least about 10,000 p.s.i. of the pressure to said partially dehydrated zeolite thereby forming said zetolitic compact.

9. A method for preparing zeolite compacts which comprises placing crystalline zeolitic molecular sieve powder between electrodes positioned in a die, evacuating said die, heating said die and crystalline zeolite molecular sieve powder until from about 80% up to about 95% of the moisture content originally contained in said zeolite powder is driven off, applying at least 10,000 p.s.i. of pressure to said zeolitic molecular sieve powder, cooling the resultant compact formed, releasing the pressure, and removing said resultant compact from said die.

10. A method according to claim 8 wherein said crystalline zeolitic molecular sieve powder is taken from the class consisting of synthetic zeolites X and Y and the naturally occurring zeolite faujasite.

11. A method for forming zeolite compacts which comprises dehydrating a crystalline zeolite of the molecular sieve type until from about 80% up to about 95% of the moisture content originally contained in said zeolite is driven off, and applying at least about 10,000 p.s.i. of pressure at an elevated temperature in the range of from at least 100° to 400° C.

References Cited by the Examiner

UNITED STATES PATENTS

| | | | |
|---|---|---|---|
| 1,174,646 | 3/16 | Williams | 18—59.3 |
| 2,137,101 | 11/38 | Spicer | 252—477 |
| 2,261,916 | 11/41 | Megow et al. | |
| 2,358,406 | 9/44 | Lichtgarn | 338—35 |
| 2,686,572 | 8/54 | Cameron et al. | 183—4.8 |
| 2,764,251 | 9/56 | Jessop | 183—4 |
| 2,958,579 | 11/60 | McCormick et al. | 23—113 |
| 2,979,381 | 4/61 | Gottstine et al. | 23—113 |
| 2,987,777 | 6/61 | Beaver et al. | 23—110 |
| 3,013,982 | 12/61 | Breck et al. | |
| 3,048,478 | 8/62 | Smith | 23—313 |
| 3,060,000 | 10/62 | Snyder et al. | 23—201 |

ALEXANDER H. BRODMERKEL, *Primary Examiner.*

WALTER BERLOWITZ, MAURICE A. BRINDISI,
*Examiners.*